United States Patent
Yee et al.

(10) Patent No.: US 7,079,329 B2
(45) Date of Patent: Jul. 18, 2006

(54) MICRO ACTUATOR FOR CONTROLLING FOCAL DEPTH

(75) Inventors: Youngjoo Yee, Gyeonggi (KR); Chang-Hyeon Ji, Seoul (KR); Seong-Hyok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 189 days.

(21) Appl. No.: 10/754,047

(22) Filed: Jan. 7, 2004

(65) Prior Publication Data

US 2004/0257672 A1  Dec. 23, 2004

(30) Foreign Application Priority Data

Jun. 17, 2003  (KR) ............... 10-2003-0039183
Jun. 17, 2003  (KR) ............... 10-2003-0039185

(51) Int. Cl.
*G02B 15/14*  (2006.01)

(52) U.S. Cl. ............. 359/696; 359/814; 359/824; 369/13.17; 369/44.11; 369/44.14; 369/44.19; 369/44.23; 369/112.01; 369/112.08; 369/115

(58) Field of Classification Search ........ 359/296, 359/813, 814, 819, 822–825, 696; 369/13.17, 369/44.14, 44.23, 44.11, 44.19, 112.01, 112.08, 369/115
See application file for complete search history.

(56) References Cited

U.S. PATENT DOCUMENTS

| | | | | |
|---|---|---|---|---|
| 5,515,346 A | * | 5/1996 | Watanabe et al. | 369/13.53 |
| 6,243,350 B1 | * | 6/2001 | Knight et al. | 369/126 |
| RE37,428 E | * | 10/2001 | Watanabe et al. | 369/13.17 |
| 6,845,066 B1 | * | 1/2005 | Shingo | 369/44.23 |
| 6,850,472 B1 | * | 2/2005 | Miyazaki et al. | 369/53.23 |
| 2005/0083791 A1 | * | 4/2005 | Watanabe et al. | 369/13.17 |

FOREIGN PATENT DOCUMENTS

JP  63-094442  4/1998

* cited by examiner

*Primary Examiner*—Evelyn A. Lester
(74) *Attorney, Agent, or Firm*—Lee, Hong, Degerman, Kang & Schmadeka

(57) ABSTRACT

A micro actuator for controlling a focal depth includes: a lens for forming a focal point by focusing light coming from a light source; a lens mounting unit having a lens mounted therein and allowing the lens to move in one axial direction; and an electromagnetic force generator consisting of a constant magnetic field generating member having a magnetic field in a predetermined direction and a variable magnetic field generating member for changing direction and strength of a magnetic field according to direction and amount of a current, installed at and around the lens mounting unit and causing the lens to move in a direction of an electromagnetic force generated by interaction of the two magnetic field generating members. The micro actuator for controlling a focal depth can be fabricated in a ultra-compact size, available for a mass production, and has a fast response speed.

25 Claims, 15 Drawing Sheets

MICRO ACTUATOR FOR CONTROLLING FOCAL DEPTH

BACKGROUND OF THE INVENTION

1. Field of the Invention

The present invention relates to a micro actuator for controlling a focal depth and, more particularly, to a micro actuator for controlling a focal depth capable of precisely controlling a focal depth of a lens focusing light.

2. Description of the Background Art

In case of an optical information recording and reproducing apparatus using a rotary optical disk as a recording and reproducing medium, a distance between a record and reproduce layer of the optical disk and a lens of an optical pick-up device changes incessantly due to a flatness error of an optical disk, a mechanical vibration of a motor rotating the optical disk and an eccentric error. Such a change deteriorates a signal-to-noise ratio of a recording and reproducing optical signal, limits a size of readable and recordable bits, and causes a mis-reading and mis-recording. Thus, in order to input light accurately focused into a record and reproduce layer, a focusing servo device adjusting a focal point of an input light actively is used.

Recently, with the optical recording and reproducing medium, in one method, in order to extend a record capacity, a record density is increased by reducing the size of data bit. In addition, in other methods which have been developed and put to practical use, a record and reproduce layer is formed at both sides of the optical disk, or a plurality of layers are stacked at one surface of the optical disk and optical information is recorded to, reproduced from and rewritten to each layer.

Especially, with the optical disk formed by stacking a plurality of layers, a focal depth controlling function of changing a focal position should be demanded to allow a laser beam to focus into an arbitrary layer where optical information is recorded, reproduced and rewritten.

Meanwhile, with the optical disk having the multi-layer, the focal distance changes infinitesimally and incessantly even within a single layer due to the aforementioned disk flatness error, a mechanical vibration of the motor rotating the optical disk and an eccentric error, and a thickness error of multi-layers formed in the optical disk.

Therefore, in case of the optical recording and reproducing apparatus using the multi-layered optical disk as a recording and reproducing medium, it is preferred to provide a precise focal depth control function for correcting a fine focal depth in an individual layer, as well as the focal depth control function required for a relatively greater displacement for moving a focal point of light to a recording or reproducing-desired layer.

In order to meet the demands, a conventional focal depth controlling micro actuator includes two cylindrical coils arranged overlapping with each other on a concentric circle. The pair of coils generate an electromagnetic force by interaction, and a focal position is controlled by moving a lens focusing light in a light axial direction by using the electromagnetic force.

However, the conventional focal depth controlling micro actuator is disadvantageous in that it can be hardly implemented as a compact size and has excessive power consumption, so it is not suitable to be adopted for a small-size information storing device.

SUMMARY OF THE INVENTION

Therefore, an object of the present invention is to provide a micro actuator capable of controlling a focal depth precisely and quickly through bi-directional driving of a lens focusing light according to a light axial direction, improving uniformity of a product and being suitable for mass-production.

To achieve these and other advantages and in accordance with the purpose of the present invention, as embodied and broadly described herein, there is provided a micro actuator for controlling a focal depth including: a lens for forming a focal pint by focusing light coming from a light source; a lens mounting unit having a lens mounted therein and allowing the lens to move in one axial direction; and an electromagnetic force generator consisting of a constant magnetic field generating member having a magnetic field in a predetermined direction and an variable magnetic field generating member for changing direction and strength of a magnetic field according to direction and amount of a current, installed at and around the lens mounting unit and causing the lens to move in a direction of an electromagnetic force generated by interaction of the two magnetic field generating members.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

There can be a plurality of embodiments of the micro actuator for controlling a focal depth in accordance with the present invention, the most preferred of which will now be described.

The coverage of the present invention is not limited to specific embodiments to be described below but can be changeable within the scope of claims.

Figure 1:
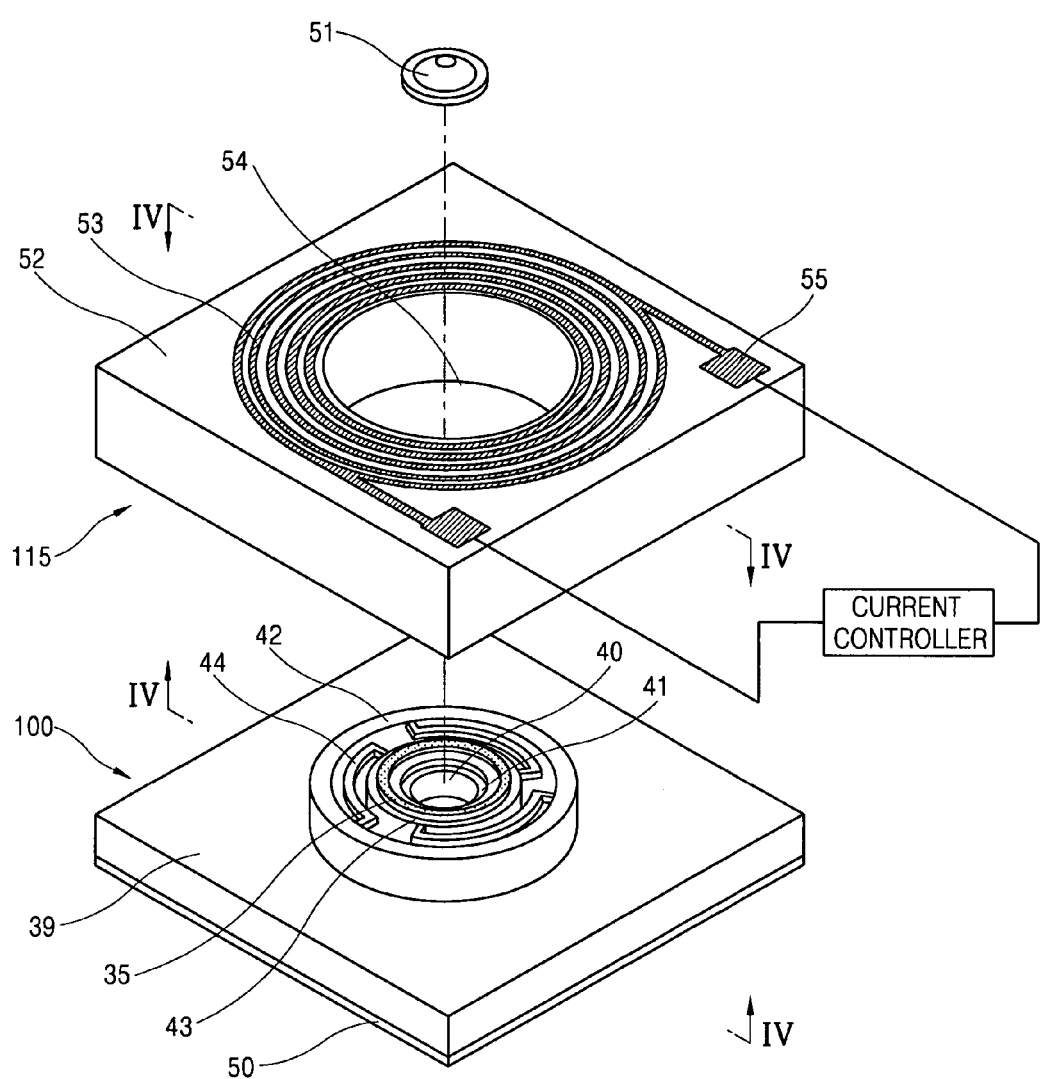
FIG. 1 is an exploded perspective view showing a lens mounting unit and a stacked coil of the micro actuator for controlling a focal depth in accordance with a first embodiment of the present invention.
Figure 2:
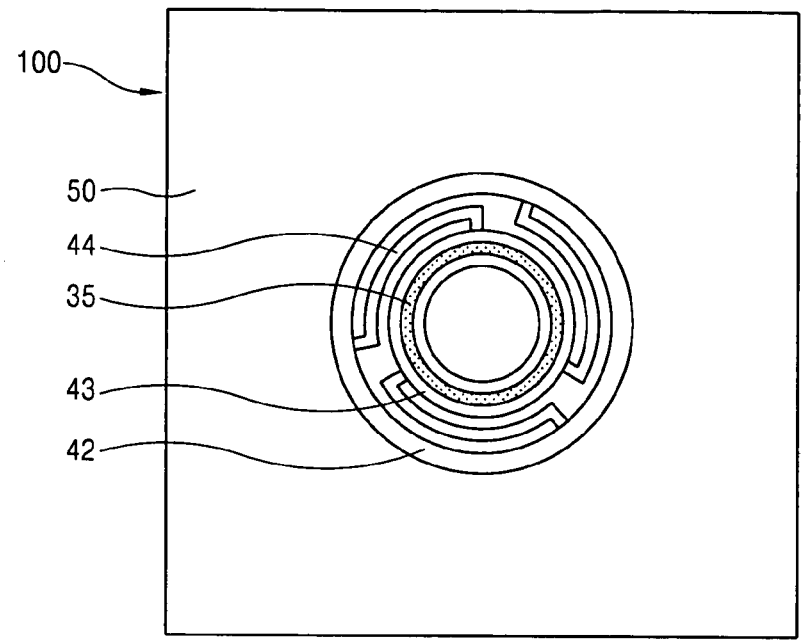
FIG. 2 is a plane view showing the lens mounting unit in accordance with the first embodiment of the present invention.
Figure 3:
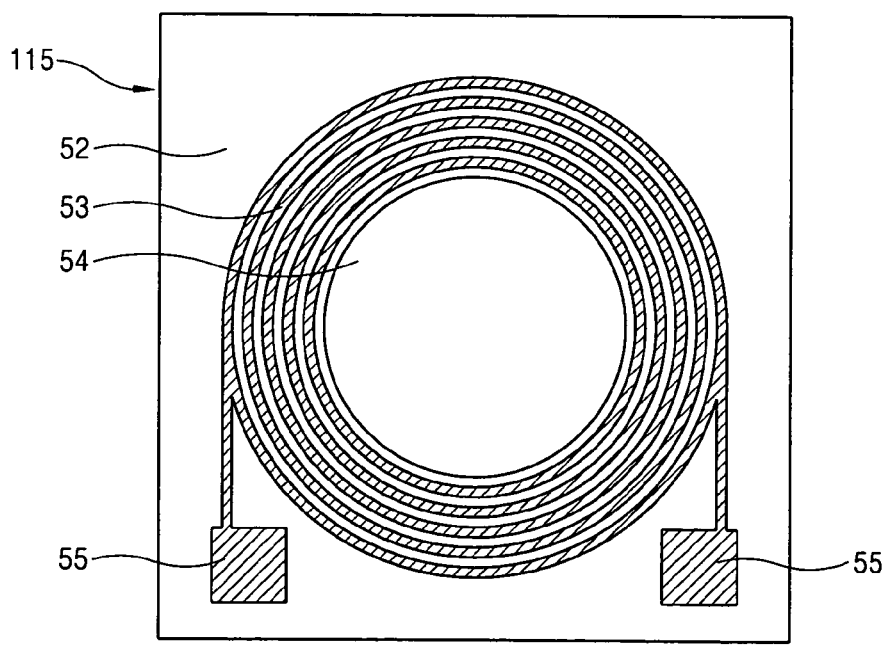
FIG. 3 is a plane view showing a stacked coil in accordance with the first embodiment of the present invention.
Figure 4:
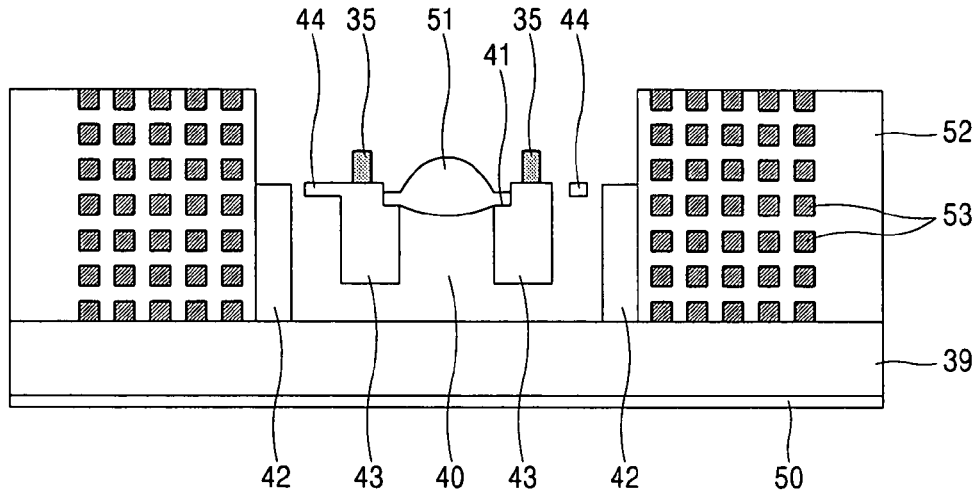
FIG. 4 is a sectional view taken along line IV—IV of FIG. 1.

FIGS. 1 to 4 show a micro actuator for controlling a focal depth in accordance with a first embodiment of the present invention. In detail, FIG. 1 is an exploded perspective view showing a lens mounting unit and a stacked coil of the micro actuator for controlling a focal depth in accordance with a first embodiment of the present invention, FIG. 2 is a plane view showing the lens mounting unit in accordance with the first embodiment of the present invention, FIG. 3 is a plane view showing a stacked coil in accordance with the first embodiment of the present invention, and FIG. 4 is a sectional view taken along line IV—IV of FIG. 1.

As shown in these drawings, a micro actuator for controlling a focal depth in accordance with the first embodiment of the present invention includes: a lens 51 for focusing light coming out of a light source and forming a focal point; a lens mounting unit 100 for mounting the lens therein and allowing the lens 51 to move in one axial direction; and an electromagnetic force generator consisting of a constant magnetic field generating member having a magnetic field in a predetermined direction and an variable magnetic field generating member for changing direction and strength of a magnetic field according to direction and amount of a current, installed at and around the lens mounting unit 100 and causing the lens to move in a direction of an electromagnetic force generated by interaction of the two magnetic field generating members.

The lens mounting unit 100 includes a fixing part 42 having a through hole formed therein; an movable part 43 positioned in the through hole formed at the fixing part 42 and providing a light proceeding path to allow light coming out of the light source to pass therethrough; and a plurality of elastic supports 44 for connecting both ends of an outer surface of the movable part 43 and an inner surface of the fixing part 42 such that the movable part 43 is elastically suspended by the fixing part 42. A lens engaging jaw 41 is formed at the inner side of the through hole 40 of the movable part 43 to allow the lens 51 to be mounted thereon.

The plurality of elastic supports 44 are made of a silicon substrate in a disk form by a semiconductor process and, preferably, have a weak rigidity for a direction that an electromagnetic force works so as to be freely deformed and a strong rigidity for other directions to restrain from being deformed.

Distanced from the movable part 43 and the plurality of elastic supports 44, a transparent substrate 39 having a prescribed thickness can be additionally attached at one side of the fixing part 42 so that the movable part 43 can be freely moved in a direction that the lens 51 is driven.

A reflectionless thin film 50 is coated at one side of the transparent substrate 39 to allow light to pass therethrough but prevent a contaminant from reaching the lens 51 from the optical disk and minimize light loss due to light reflection.

The constant magnetic field generating member, one element of the electromagnetic force generator, is formed as a magnetic material 35 in a ring type or in a divided ring type at one side of the movable part 43 to encompass the lens 51 mounted in the through hole 40 formed in the movable part 43, and the variable magnetic field generating member, the other element of the electromagnetic force generator, is formed as a laminated coil 115 encompassing the surroundings of the lens mounting unit 100.

The laminated coil 115 includes an insulation resin 52 with a through hole 54 formed therein to allow the fixing part 42 to be insertedly fixed therein; a conductor 53 made of a metallic material, buried in the insulation resin 52 to encompass the fixing part, and having a smaller diameter; and an electrode pad 55 formed at an upper end of the insulation resin 52 to apply a driving current to the conductor 53. The electrode pad 55 is electrically connected to an external current controller.

Instead of being formed at the upper end of the insulation resin 52, the electrode pad 55 can be formed at one side of the transparent substrate 39 by processing the transparent substrate 39 to be protruded outwardly in relation to one side of the insulation resin 52 an connected to an end of the conductor 53 in a coil form buried in the insulation resin 52.

In addition, the laminated coil 115 can be constructed as a laminated ceramic circuit board such as a multi-layer printed circuit board or an LTCC (Low Temperature Co-fired Ceramic) board so that more conductors 53 per unit area can be buried therein.

The operation of the micro actuator for controlling a focal depth in accordance with the first embodiment of the present invention will now be described.

Figure 5:
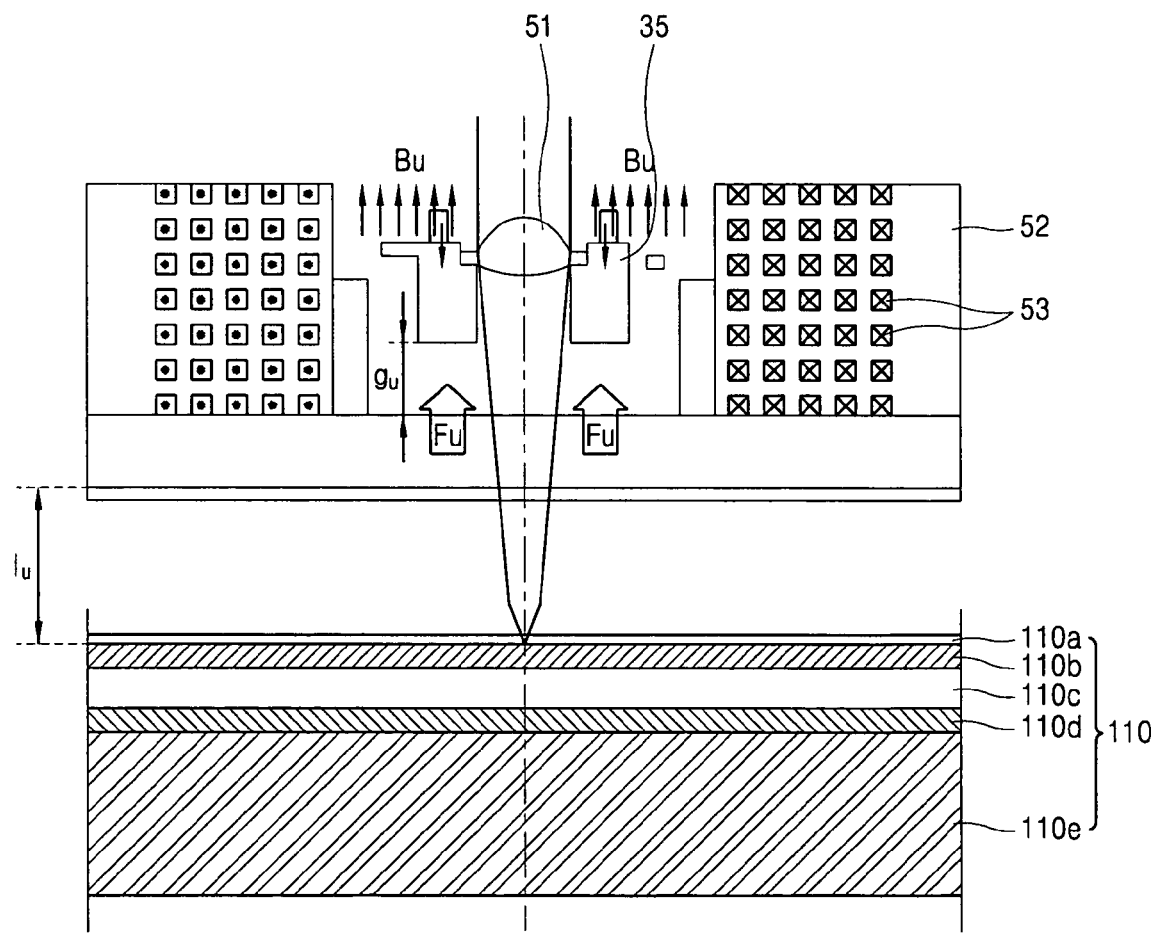
FIG. 5 is a front sectional view showing that a focal depth of the micro actuator for controlling a focal depth lengthens in accordance with the first embodiment of the present invention.
Figure 6:
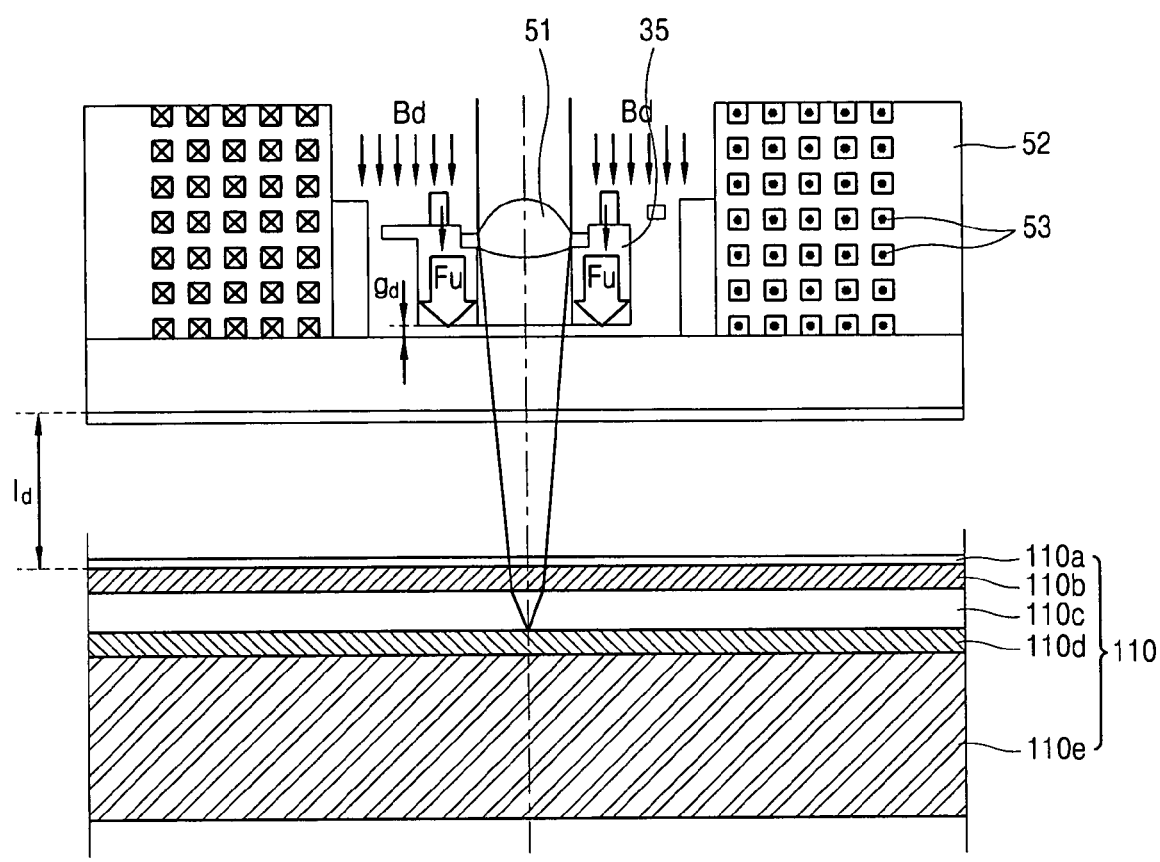
FIG. 6 is a front sectional view showing a focal depth of the micro actuator for controlling a focal depth shortens in accordance with the first embodiment of the present invention.

FIG. 5 is a front sectional view showing that a focal depth of the micro actuator for controlling a focal depth lengthens in accordance with the first embodiment of the present invention and FIG. 6 is a front sectional view showing that a focal depth of the micro actuator for controlling a focal depth shortens in accordance with the first embodiment of the present invention.

The optical disk 110 having a multi-layered record layer includes upper and lower record layers 110b and 110d for storing data; a protection layer 110a for protecting the record layers 110b and 110d from outside of the optical disk; a separation layer 110c placed between the upper record layer 110b and the lower record layer 110d to separate them; and a substrate 110e of the optical disk. A magnetization direction of the magnetic material 35 to be attached is made downward in the drawing.

As shown in FIG. 5, as a current is applied to the conductor 53 of the laminated coil 115 from the current controller, an induced magnetic field ($B_u$) is formed according to an ampere law inside the through hole 54 of the laminated coil 115.

Since the induced magnetic field ($B_u$) directs upward in the drawing, the opposite to the magnetization direction of the magnetic material 53, the electromagnetic force ($F_u$) resulted from an interaction between the induced magnetic field ($B_u$) and the magnetic field according to the magnetic material 53 compels the movable part 43 to move in a direction that it goes away from the optical disk 110.

At this time, a restoration force is generated from the plurality of elastic supports 44 in the opposite direction in proportion to a displacement amount of the movable part 43, and a position of the movable part 43 is determined at a point where the restoration force and the electromagnetic force ($F_u$) make a balance.

Consequently, the lens 51 is also moved in a direction away from the optical disk 110, and accordingly, a focal depth of the lens 51 is reduced and a focal point is made on the upper record layer 110b.

Conversely, as shown in FIG. 6, as a current is applied to the conductor 53 of the laminated coil 115, an induced magnetic field ($B_d$) is formed according to an ampere's law in the through hole 54 of the laminated coil 115.

Since the induced magnetic field ($B_d$) directs downward in the drawing, the same as the magnetization direction of the magnetic material 53, the electromagnetic force ($F_d$) resulting from an interaction between the induced magnetic field ($B_d$) and the magnetic field according to the magnetic material 53 compels the movable part 43 to move in a direction that it nears the optical disk 110.

At this time, a restoration force is generated from the plurality of elastic supports 44 in the opposite direction in proportion to a displacement amount of the movable part 43, and a position of the movable part 43 is determined at a point where the restoration force and the electromagnetic force ($F_d$) make a balance.

Accordingly, the lens 51 is also moved in a direction of nearing the optical disk 110, and thus, a focal depth of the lens 51 is increased and a focal point is made on the lower record layer 110d. At this time, in order to prevent a possible mutual intervention between the lower end of the movable part 53 and the lower end, the interval ($g_u$) therebetween needs to have more than a prescribed value.

Though an operation related to an infinitesimal focal point correction in the same record layer is not shown, its operational principle is the same as the focal point movement between record layers, and only a focal point distance change is infinitesimal.

FIGS. 7A to 7M are sectional views showing a sequential process of the lens mounting unit of the micro actuator for controlling a focal depth in accordance with the first embodiment of the present invention.

FIGS. 7A to 7M illustrate only one lens mounting unit, but an actual process is performed by a micro-machining technique based on a semiconductor process, through which many devices just like the one illustrated in the drawings can be fabricated simultaneously on a wafer-type substrate.

Figure 7A:
FIGS. 7A to 7M are sectional views showing a sequential process of the lens mounting unit of the micro actuator for controlling a focal depth in accordance with the first embodiment of the present invention.

As shown in FIG. 7A, a wafer-type silicon substrate 30 is used as a start material and first etch masking thin films 31 and 32 are formed at both sides of a substrate 30. The first etch masking thin films are made of a material having insulation characteristics such as silicon oxide or silicon nitride which has a high etch selectivity over silicon according to an etching method and a chemical material causing an etching reaction during a follow-up silicon etching process.

Figure 7B:
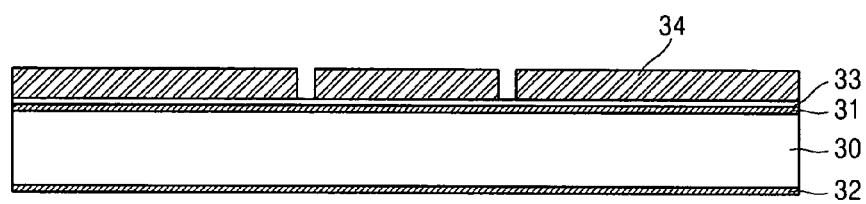

Next, as shown in FIG. 7B, a seed thin film in a follow-up electroplating process is formed on the first etch masking thin film 31 formed at one side of the silicon substrate 30 by using a thin film depositing method such as evaporation or sputtering, on which a photosensitive film is coated and then a plating mold 34 is formed through photolithography.

Figure 7C:
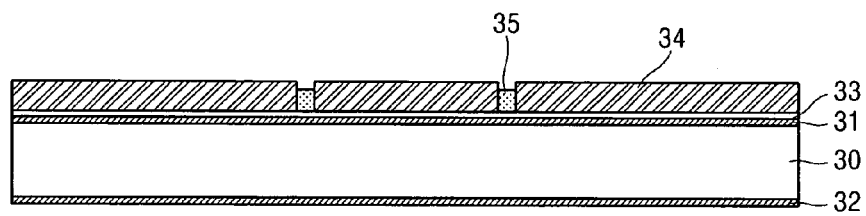

And then, as shown in FIG. 7C, a magnetic material 35 such as nickel or ferrite is formed with a prescribed thickness in the plating mold 34 by using an electroplating, and then, the plating mold 34 made of a photosensitive material is removed.

Figure 7D:
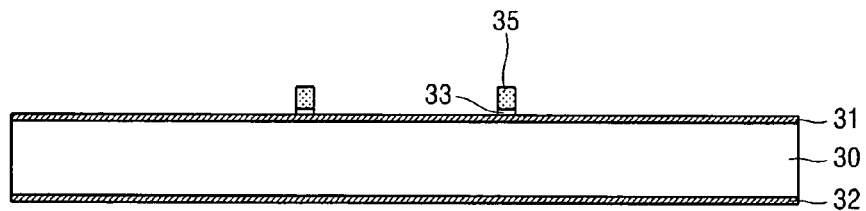

Thereafter, as shown in FIG. 7D, the seed thin film remaining around the patterned magnetic material 35 is selectively removed.

Figure 7E:
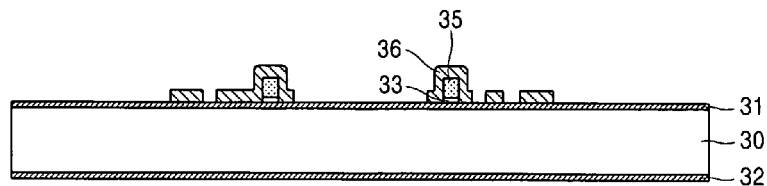

Subsequently, as shown in FIG. 7E, the second etch masking thin film 36 made of a photosensitive material is formed on the surface where the magnetic material 35 has been patterned.

Figure 7F:
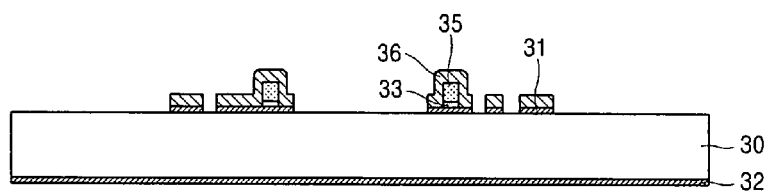

And then, as shown in FIG. 7F, a portion of the first etch masking thin film 36, not protected by the second etch masking thin film 36, is selectively removed by a dry etching method such as a reactive ion etching or a wet etching method using hydrofluoric acid (HF).

Figure 7G:
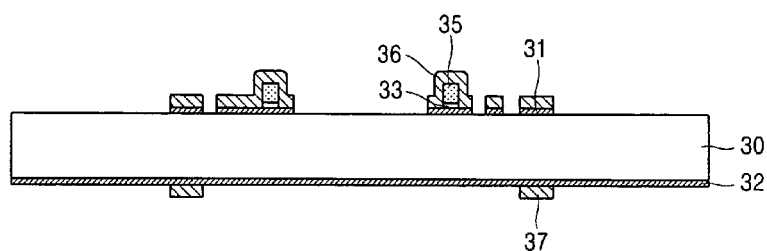

Thereafter, as shown in FIG. 7G, a third etch masking thin film 37 made of a photosensitive material is formed on the non-patterned first etch masking thin film 32 and patterned in such a manner that a portion to make a fixing part 42 is not etched.

Figure 7H:
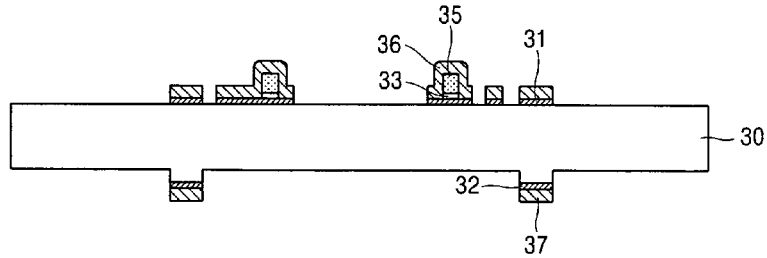

Then, as shown in FIG. 7H, the first etch masking thin film 32, not protected by the third etch masking thin film 37, is selectively etched by the dry etching method such as the reactive ion etching (RIE) or by using the wet etching solution such as HF.

And the exposed silicon substrate 30 is etched by using a silicon deep RIE to make the thickness of the etched silicon substrate 30 have the same height as the movable part 43. And then, the second and third etch masking thin films 36 and 37 remaining at both sides of the silicon substrate 30 are removed.

Figure 7I:
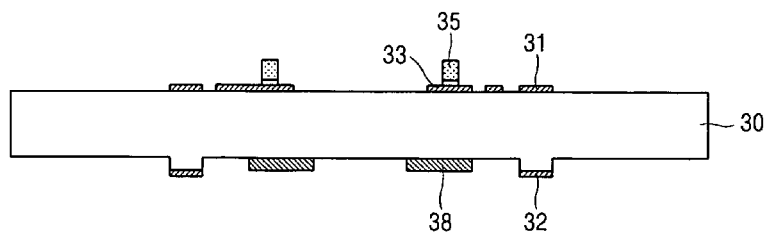

Thereafter, as shown in FIG. 7I, in order to protect the portion to become the movable part 43, a fourth etch masking thin film 38 is coated at the opposite side of the silicon substrate 30 with the patterned magnetic material 35, and then patterned.

Figure 7J:
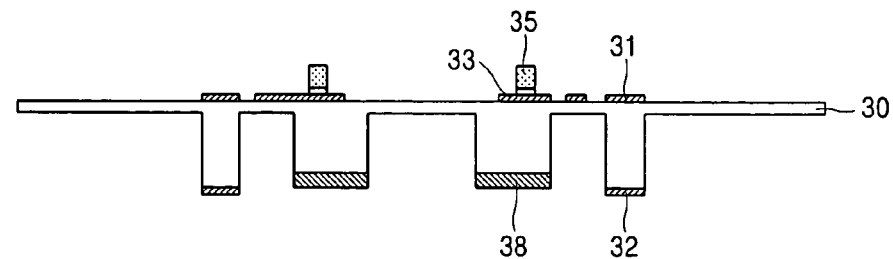

And then, as shown in FIG. 7J, the fourth etch masking thin film 38-patterned silicon substrate 30 is etched with a prescribed depth by using the RIE or the silicon deep RIE to remove the fourth etch masking thin film 38. The thickness of silicon remaining after the etching is performed becomes the thickness of the elastic support 44.

Figure 7K:
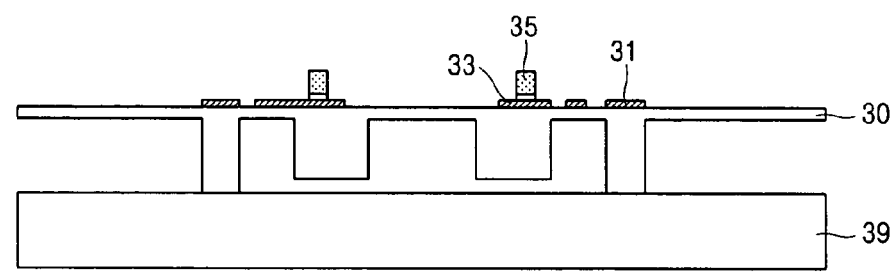

Subsequently, as shown in FIG. 7K, a transparent substrate 39 is bonded to the lower surface of the silicon substrate with a resulting structure after removing the fourth etch masking thin film 38. If the transparent substrate 39 is made of a material containing sodium (NA), the two substrates are bonded by an anodic bonding, one of a fine processing technique.

Figure 7L:
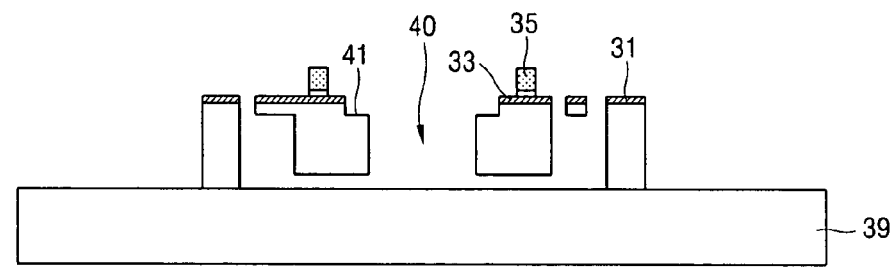

And then, as shown in FIG. 7L, the side of the silicon substrate 30, to which the transparent substrate 39 is not bonded, is etched by the RIE or the silicon deep RIE to penetrate the silicon substrate. During this process, the through hole 40 and the lens engaging jaw 41, making a light proceeding path, are formed in the movable part 43.

Figure 7M:
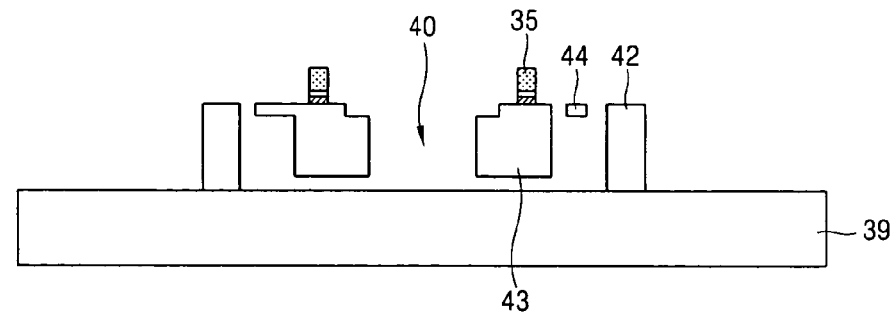

Then, as shown in FIG. 7M, the remaining first etch masking thin film 32 is selectively removed to complete fabrication of the movable part 43, the elastic support 44 and the fixing part 42, which are then separated into individual chips each with a prescribed size by a dicing method or the like to complete fabrication of the lens mounting unit 100 of the micro actuator for controlling a focal depth of the present invention.

And then, the lens 51 is mounted to be assembled to the through hole 40 making the light proceeding path formed inside the movable part 43, the movable part 43 is insertedly fixed to the through hole 54 formed at the laminated coil 115, and the current controller is connected to the electrode pad 55, thereby completing a micro actuator for controlling a focal depth in accordance with the first embodiment of the present invention.

Figure 8:
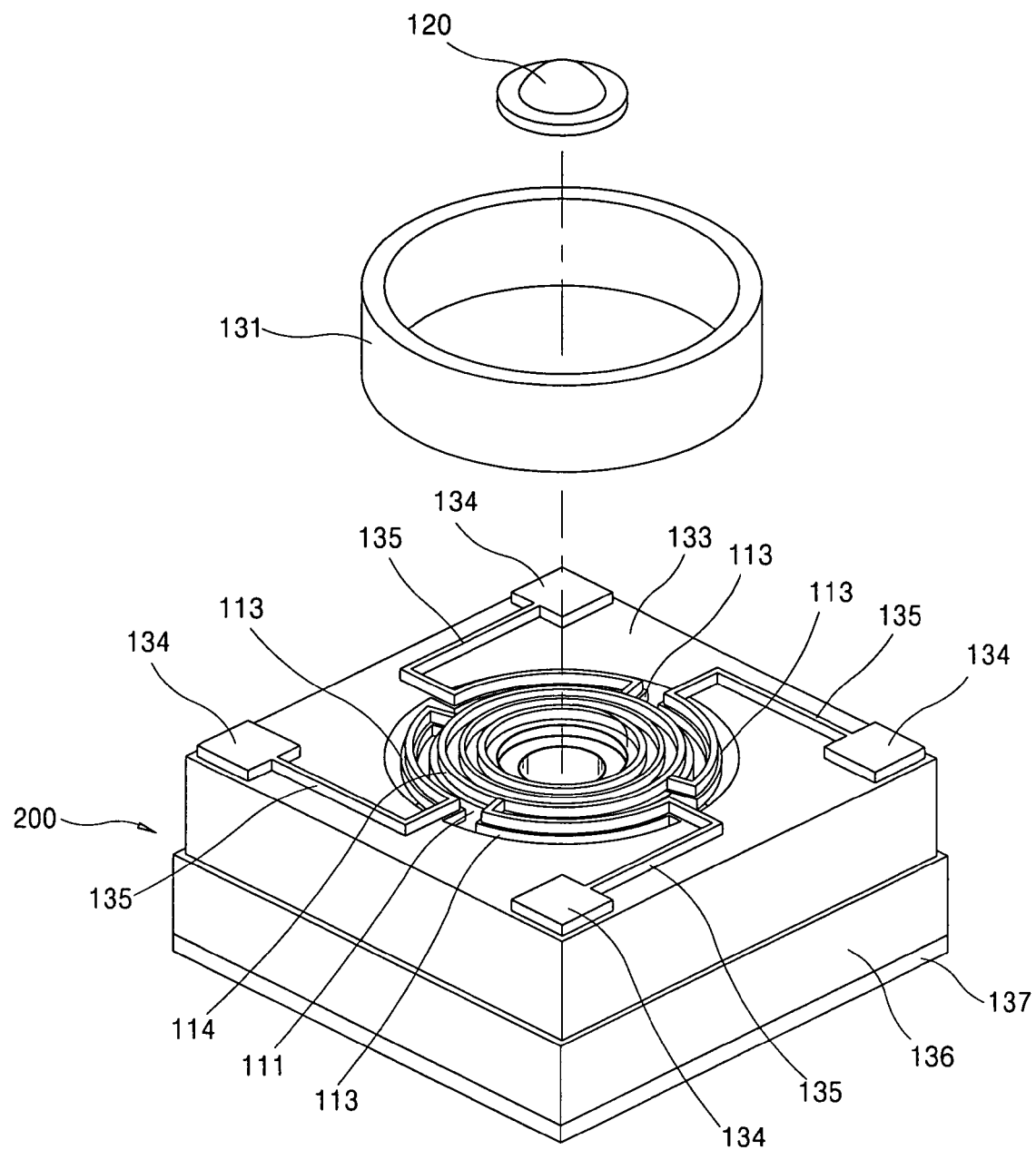
FIG. 8 is an exploded perspective view showing a permanent magnet and a lens driving unit of a micro actuator for controlling a focal depth in accordance with a second embodiment of the present invention.
Figure 9:
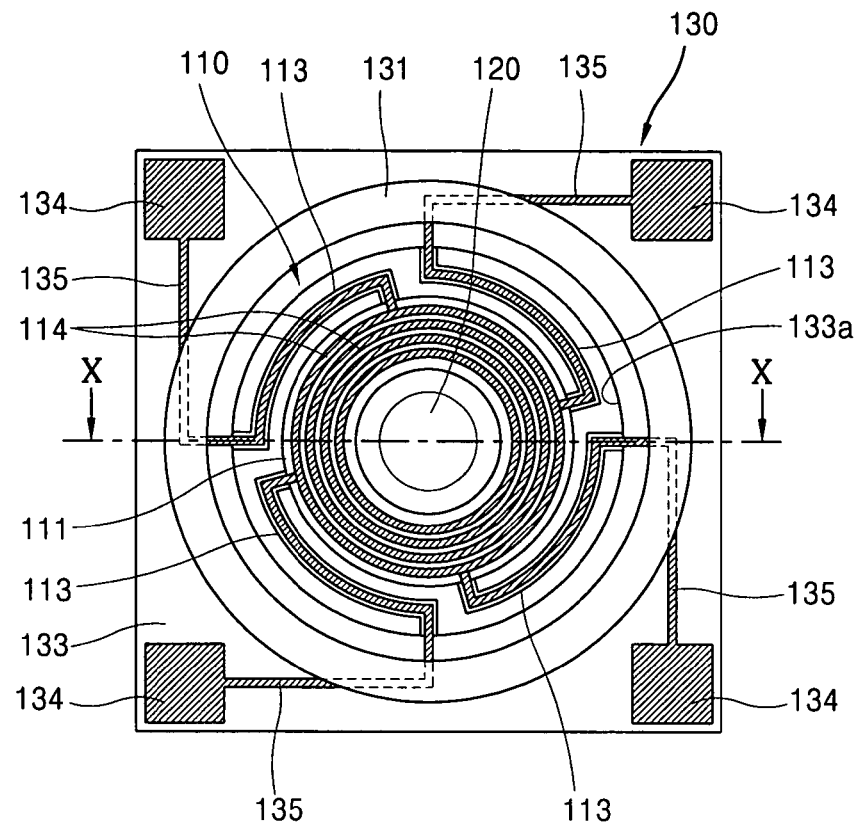
FIG. 9 is a plane view of the micro actuator for controlling a focal depth in accordance with the second embodiment of the present invention.
Figure 10:
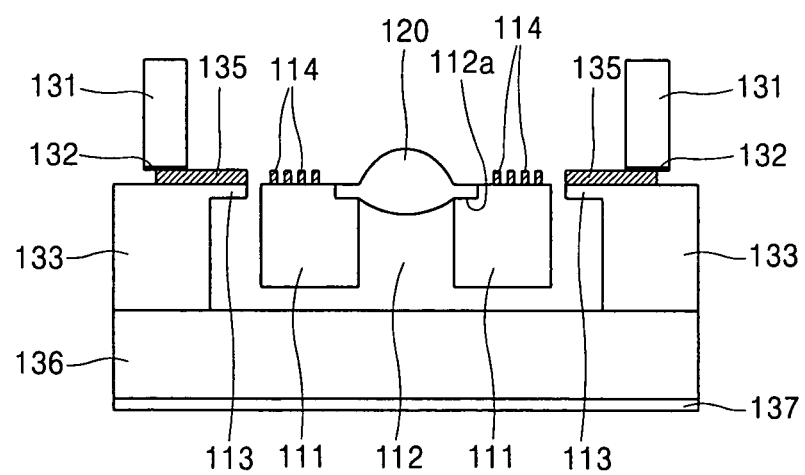
FIG. 10 is a sectional view taken along line X—X of FIG. 9.

FIGS. 8 to 10 show a micro actuator for controlling a focal depth in accordance with a second embodiment of the present invention.

FIG. 8 is an exploded perspective view showing a permanent magnet and a lens driving unit of a micro actuator for controlling a focal depth in accordance with a second embodiment of the present invention, FIG. 9 is a plane view of the micro actuator for controlling a focal depth in accordance with the second embodiment of the present invention, and FIG. 10 is a sectional view taken along line X—X of FIG. 9.

A micro actuator for controlling a focal depth in accordance with the second embodiment of the present invention includes: a lens 120 for focusing light coming out of a light source and forming a focal point; a lens mounting unit 200 for mounting the lens therein and allowing the lens 120 to move in one axial direction; and an electromagnetic force generator consisting of a constant magnetic field generating member having a magnetic field in a predetermined direction and an variable magnetic field generating member for changing direction and strength of a magnetic field according to direction and amount of a current, installed at and around the lens mounting unit 200 and causing the lens to move in a direction of an electromagnetic force generated by interaction of the two magnetic field generating members.

The lens mounting unit 200 includes a fixing part 133 having a through hole formed therein; an movable part 111 positioned in the through hole of the fixing part 133 and having a through hole therein to allow light coming out of a light source to pass therethrough; and a plurality of elastic supports 113 for connecting one end of an inner surface of the through hole of the fixing part 133 and one end outside the movable part 111 such that the movable part 111 is elastically suspended. A lens engaging jaw 112a is formed at one inner end of the through hole 112 of the movable part 111 to allow the lens to be mounted thereon.

The plurality of elastic supports 113 are made of a silicon substrate in a disk form by a semiconductor process and, preferably, have a weak rigidity for a direction that an electromagnetic force works so as to be freely deformed and a strong rigidity at other directions to restrain from being deformed.

Distanced from the movable part 111 and the plurality of elastic supports 113, a transparent substrate 136 having a prescribed thickness can be additionally attached at one side of the fixing part 42 so that the movable part 111 can be freely moved in a direction that the lens is driven.

The transparent substrate 136 serves to prevent a contaminant from reaching the lens 120 from the optical disk and is formed with a prescribed thickness in consideration of its light refraction degree. A reflectionless coating film 137 is coated on the transparent substrate 136 to minimize light loss by light reflection.

The constant magnetic field generating member, one element of the electromagnetic force generator, is formed as a permanent magnet 131 positioned in the vicinity of the lens mounting unit 200 and forming a magnetic field fixed in a predetermined direction. The variable magnetic field generating member, the other element of the electromagnetic force generator, is formed as a flat plate coil 114 positioned in the vicinity of the lens 120 and integrated at one side of the movable part 111.

The flat plate coil 114 can be formed as a single step or a multi-step by a micro-machining technique, or can be fabricated by using a self-bonding wire and bonded to the movable part 111.

In addition, a plurality of electrode pads 134 are formed at one side of the fixing part 133 and connected to the coil 114 by an electric line, so as to be electrically connected to an external current controller for applying a current to the flat plate coil 114.

The plurality of lines 135 connecting the coil 114 and the electrode pad 134 are preferably formed on the plurality of elastic supports 113, and there can be formed only two electrode pads 134, the least number, for inputting a current to the coil 114.

The permanent magnet 131 needs to encompass a proceeding path of light coming out of the light source. Thus, the permanent magnet 131 can be disposed in various forms as follows.

As shown in FIGS. 8 to 10, the permanent magnet 131 can be disposed at an upper end of the fixing part 133. In this case, an electric short may occur as the permanent magnet formed as a conductor is in contact with the electrode pad or the wire 135 installed at one end of the fixing part 133. Thus, in order to prevent such an electric short, an insulation film 132 is coated either at the surface of the electrode pad 134 or the wire 135 contacting with the permanent magnet 131, or at the permanent magnet 131.

Figure 11:
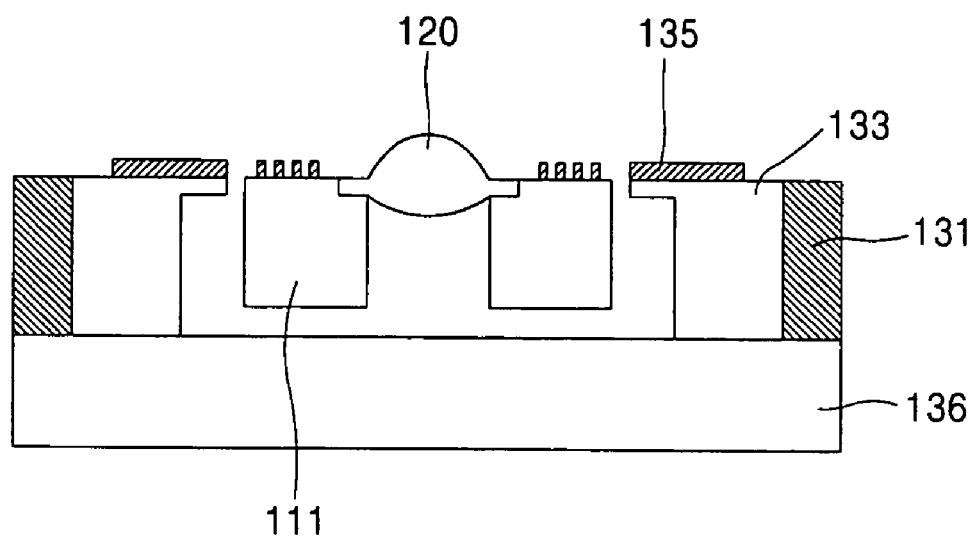
FIGS. 11 to 13 are sectional views showing several disposition states of the permanent magnet in accordance with the second embodiment of the present invention.
Figure 12:
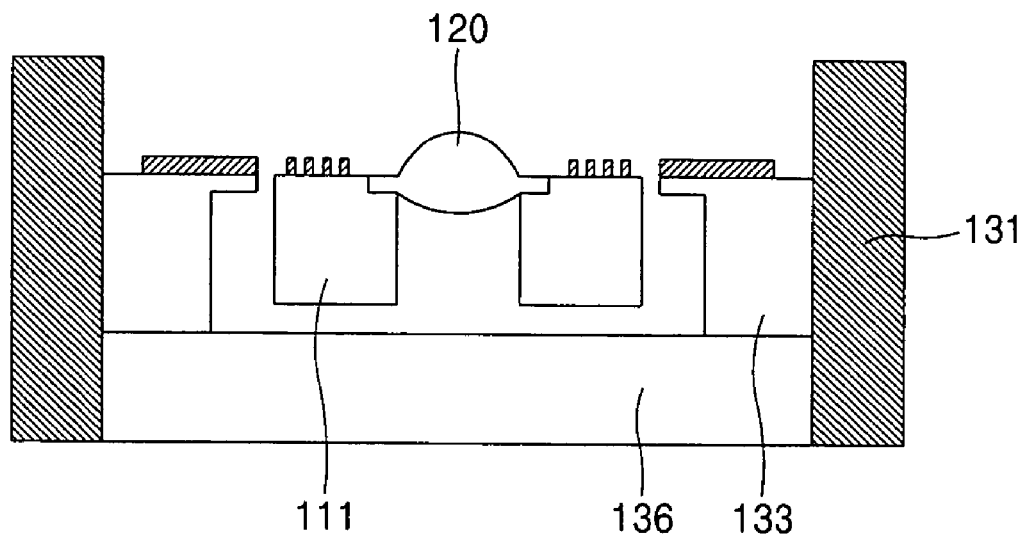

In addition, as shown in FIG. 11, the transparent substrate 136 is formed larger than the contact surface in contact with the fixing part 133, so that the permanent magnet 131 can be formed on the transparent substrate 136 to surround the fixing part 133, or as shown in FIG. 12, the permanent magnet 131 can be disposed to surround both the fixing part 133 and the transparent substrate 136.

Figure 13:
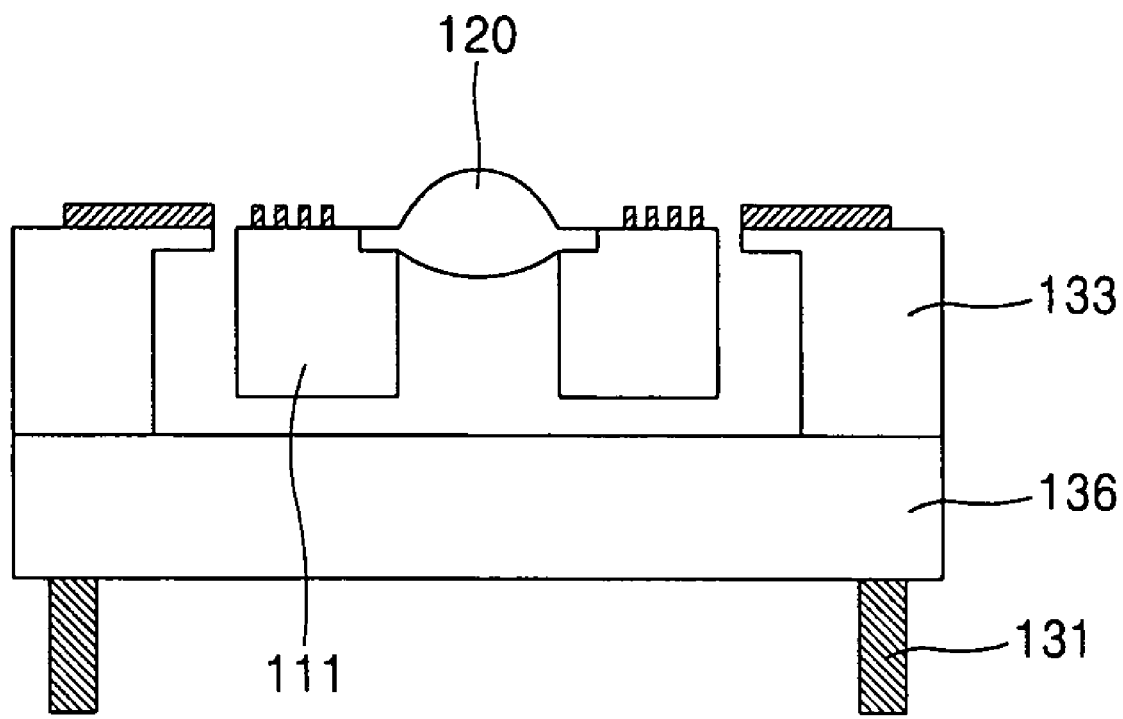

Moreover, as shown in FIG. 13, the permanent magnet 131 can be disposed at a lower side of the transparent substrate 136.

Namely, the permanent magnet 131 needs only to encompass the light proceeding path, and its installation position can be freely determined according to its use.

The permanent magnet 131 can be formed in a ring type or a divided ring type to encompass the flat plate coil 114, and its size can be determined according to a strength of the magnetic field.

The operation of the micro actuator for controlling a focal depth in accordance with the second embodiment of the present invention will now be described.

Figure 14:
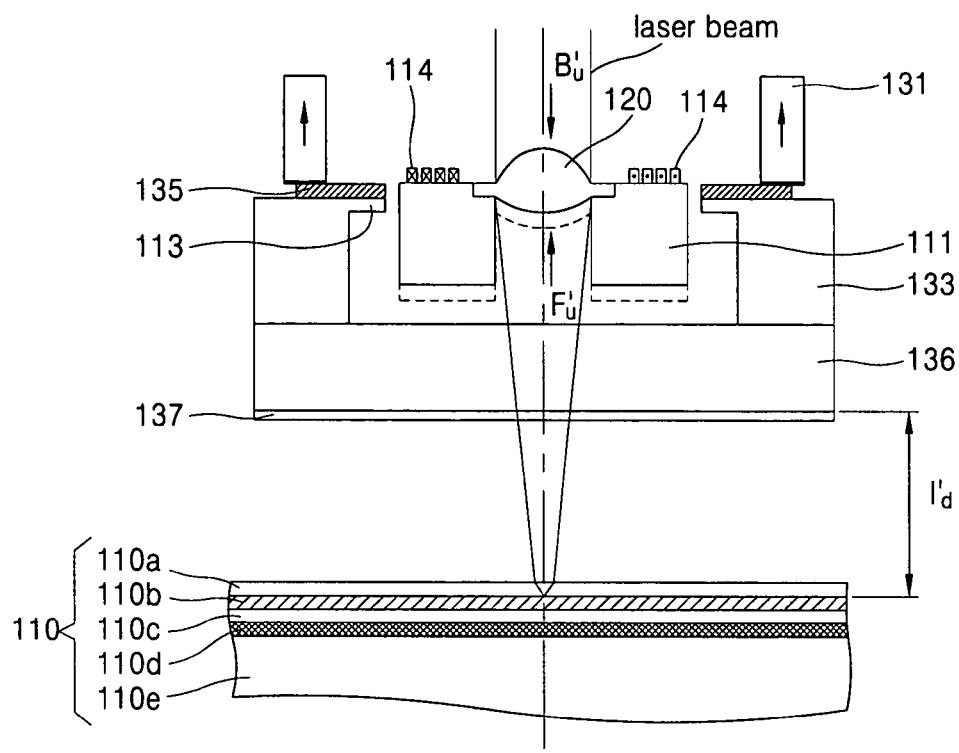
FIG. 14 is a front sectional view showing that a focal depth of the micro actuator for controlling a focal depth lengthens in accordance with the second embodiment of the present invention.
Figure 15:
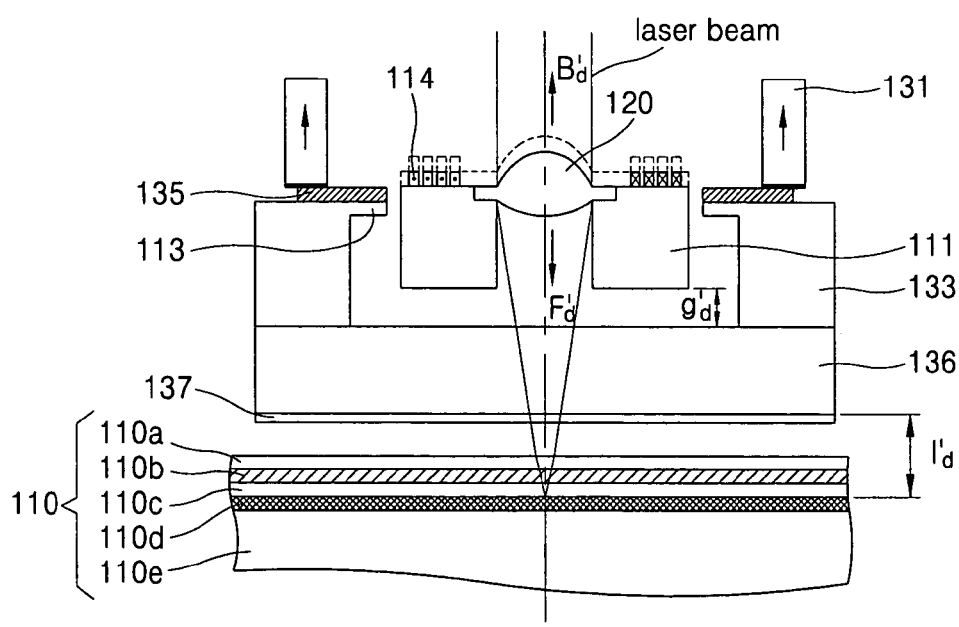
FIG. 15 is a front sectional view showing that a focal depth of the micro actuator for controlling a focal depth shortens in accordance with the second embodiment of the present invention.

FIG. 14 is a front sectional view showing that a focal depth of the micro actuator for controlling a focal depth lengthens in accordance with the second embodiment of the present invention and FIG. 15 is a front sectional view showing that a focal depth of the micro actuator for controlling a focal depth shortens in accordance with the second embodiment of the present invention.

The optical disk 110 having the multi-layer record layer has the similar structure to that of the first embodiment of the present invention, and a direction of magnetic field of the permanent magnet is applied upward in the drawing.

As shown in FIG. 14, as a current is applied to the flat plate coil 114 formed at the movable part 111 from the current controller, an induced magnetic field ($B_u'$) is formed according to an ampere law around the flat plate coil 114.

Since the induced magnetic field ($B_u'$) directs downward in the drawing, the opposite to the direction of the magnetic field of the permanent magnet 131 encompassing the induced magnetic field ($B_u'$), the electromagnetic force ($F_u'$) resulted from an interaction between the induced magnetic field ($B_u'$) and the magnetic field according to the permanent magnet 131 compels the movable part 111 to move in a direction that it goes away from the optical disk 110.

At this time, a restoration force is generated from the plurality of elastic supports 113 in the opposite direction in proportion to a displacement amount of the movable part 111, and a position of the movable part 111 is determined at a point where the restoration force and the electromagnetic force ($F_u'$) make a balance.

Consequently, the lens 120 is also moved in a direction of being away from the optical disk 110, and accordingly, a focal depth of the lens 120 is reduced and a focal point is made on the upper record layer 110b.

Conversely, as shown in FIG. 15, as a current is applied to the flat plate coil 114 formed at the movable part 111, an induced magnetic field ($B_d'$) is formed around the flat plate coil 114 according to the ampere's law.

Since the induced magnetic field ($B_d'$) directs upward in the drawing, the same as the direction of the magnetic field of the permanent magnet 131, the electromagnetic force ($F_d'$) resulting from an interaction between the induced magnetic field ($B_d'$) and the magnetic field according to the permanent magnet 131 compels the movable part 111 to move in a direction that it nears the optical disk 110.

At this time, a restoration force is generated from the plurality of elastic supports 113 in the opposite direction in proportion to a displacement amount of the movable part 111, and a position of the movable part 111 is determined at a point where the restoration force and the electromagnetic force ($F_d'$) make a balance.

Accordingly, the lens 120 is also moved in a direction of nearing the optical disk 110, and thus, a focal depth of the lens 120 is increased and a focal point is made on the lower record layer 110e. At this time, in order to prevent a possible mutual intervention between the lower end of the movable part 111 and the lower end, the interval ($g_d'$) therebetween needs to have more than a prescribed value.

Though an operation related to an infinitesimal focal point correction in the same record layer is not shown, its operational principle is the same as the focal point movement between record layers, and only a displacement according to driving is infinitesimal.

The fabrication method of the micro actuator for controlling a focal depth in accordance with the second embodiment of the present invention will now be described.

FIGS. 16A to 16I are sectional views showing a sequential process of forming the lens mounting unit of the micro actuator for controlling a focal depth in accordance with the second embodiment of the present invention.

FIGS. 16A to 16I illustrate only one lens mounting unit, but an actual process is performed by a micro-machining technique based on a semiconductor process, through which many devices just like the one illustrated in the drawings can be fabricated simultaneously on a wafer-type substrate.

Figure 16A:
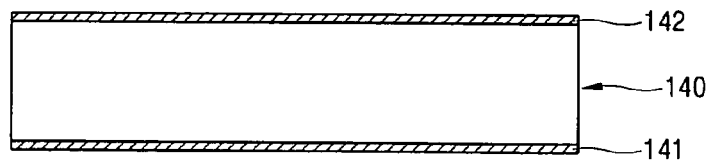
FIG. 16A to 16I are sectional views showing a sequential process of forming the lens mounting unit of the micro actuator for controlling a focal depth in accordance with the second embodiment of the present invention.

As shown in FIG. 16A, a wafer-type silicon substrate 140 is used as a start material and first and etch masking thin films 141 and 142 are formed at both sides of a substrate 30. The first and second etch masking thin films 141 and 142 are made of a material having insulation characteristics through techniques of a semiconductor device fabrication process such as deposition, evaporation and plating. The material for making the first and second etch masking thin films 141 and 142 can be a material having insulation characteristics such as an silicon oxide or a silicon nitride.

Figure 16B:
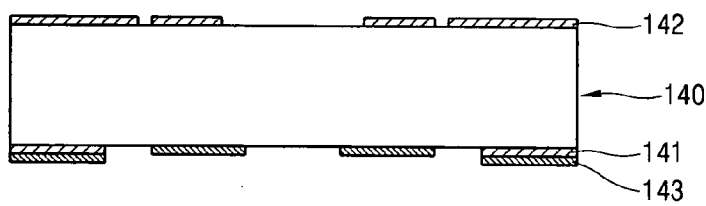

Next, as shown in FIG. 16B, the first and second etch masking thin films 141 and 142 formed at both sides of the silicon substrate are patterned, and then, a third etch masking thin film 143 formed on the first etch masking film 141 is patterned. The third etch masking thin film 143 needs to have an etch selectivity with the first and second etch masking thin films 141 and 142 as well as silicon. As a material for the third etch masking thin film 143, a photosensitizer can be used.

Figure 16C:
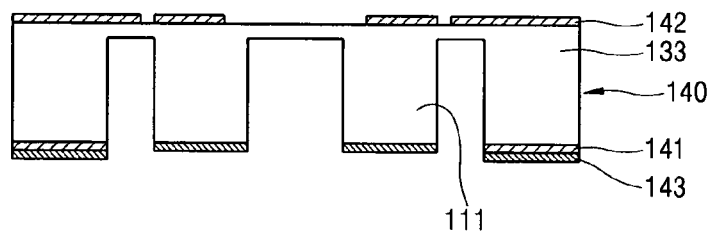

And then, as shown in FIG. 16C, the side of the silicon substrate 140 where the third etch masking thin film 142 is formed is etched with a prescribed depth by using the RIE or the silicon deep RIE technique, an anisotropic shape processing technique, to roughly form the movable part 111 and the fixing part 133.

Figure 16D:
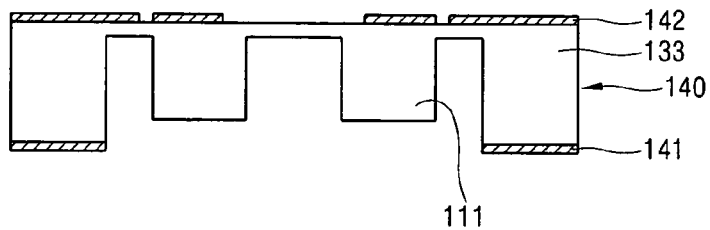

Thereafter, as shown in FIG. 16D, the third etch masking thin film 143 is removed and the etched surface of the silicon substrate 140 is again etched by the RIE or the silicon deep RIE.

Figure 16E:
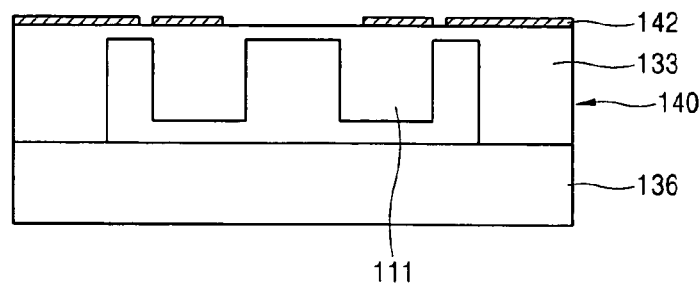

And then, as shown in FIG. 16E, a transparent substrate 136 is bonded to the resulting surface of the silicon substrate without the first etch masking thin film 141. If the transparent substrate 136 is made of glass containing sodium (NA), the two substrates are bonded by an anodic bonding method, one of the micro-machining technique.

Figure 16F:
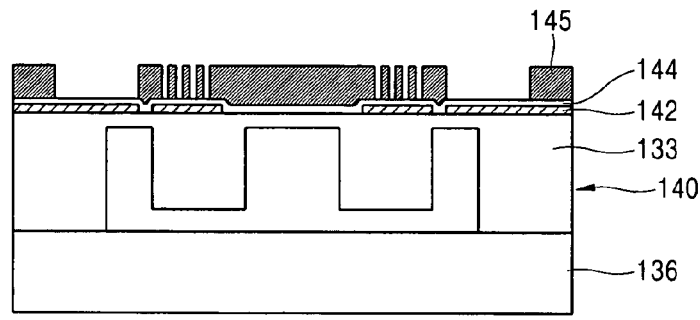

Subsequently, as shown in FIG. 16F, a seed layer 144 for an electroplating process to be performed later is formed on the second etch masking thin film 142-patterned silicon substrate by using a thin film deposition method such as evaporation or sputtering, on which a plating mold 145 is formed by using a photosensitive film.

Figure 16G:
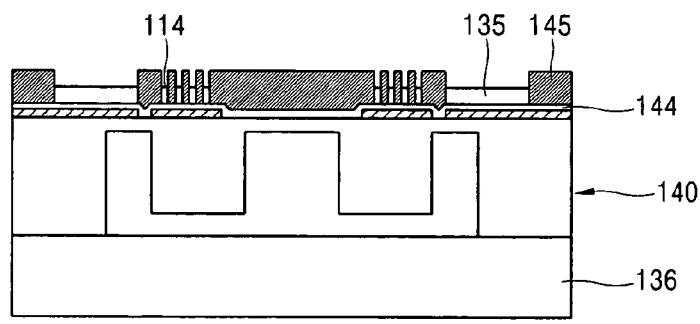

And then, as shown in FIG. 16G, a conductor such as gold, copper, or the like, is formed with a prescribed thickness in the plating mold through electroplating.

Figure 16H:
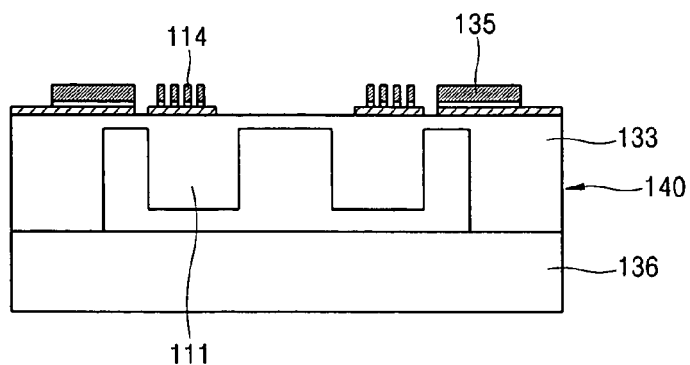

Then, as shown in FIG. 16H, the photosensitive film used as the plating mold 145 is removed and the seed layer 144 is also removed to form the flat plate type coil 114 and the electrode pad 135.

Figure 16I:
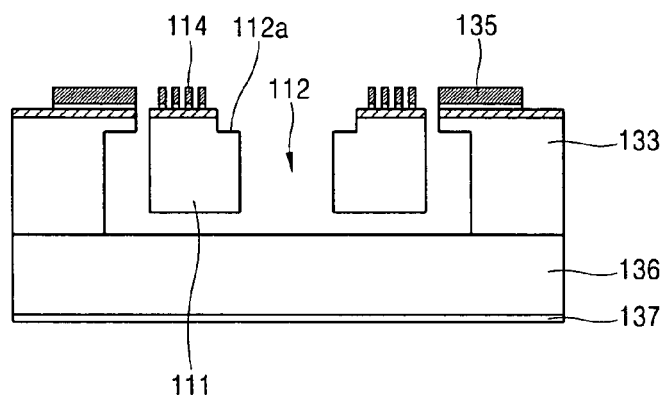

Subsequently, as shown in FIG. 16I, the silicon substrate 140 is etched by using the RIE or the silicon deep RIE technique to form the through hole 112 and the lens engaging jaw 112a at the movable part 111. A reflectionless thin film 137 can be coated at one surface of the transparent substrate 136 as necessary.

The plurality of lens mounting units fabricated on the silicon substrate are separated to individual chips by a method such as dicing, and the lens mounting unit 200 and the permanent magnet 131 are coupled to complete the micro actuator for controlling a focal depth in accordance with the second embodiment of the present invention.

As so far described, the micro actuator for controlling a focal depth in accordance with the present invention has the following advantages.

That is, for example, first, the laminated coil by burying the conductor with a coil shape in an insulation resin and a magnetic material formed at the lens mounting unit are used as an electromagnetic force generator, or the flat plate type coil formed at the lens mounting unit and the permanent magnet forming an external magnetic field are used as the electromagnetic force generator. Thus, the micro actuator can be fabricated with a ultra-compact size, the lens can be precisely driven bi-directionally to extend or reduce the lens focal depth, driving power is reduced, and a response speed can be improved.

In addition, with such a structure, an assembly of each component can be facilitated.

Moreover, the micro actuator for controlling a focal depth of the present invention can be easily processed by a micro-machining technique based on the semiconductor fabrication process. Therefore, a fabrication cost can be reduced, uniformity among elements can be enhanced, and a mass-production is available.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A micro actuator for controlling a focal depth comprising:
   a lens for forming a focal point by focusing light coming from a light source;
   a lens mounting unit having a lens mounted therein and allowing the lens to move in one axial direction; and
   an electromagnetic force generator consisting of a constant magnetic field generating member having a magnetic field in a predetermined direction and a variable magnetic field generating member for changing direction and strength of a magnetic field according to direction and amount of a current, installed at and around the lens mounting unit and causing the lens to move in a direction of an electromagnetic force generated by interaction of the two electromagnetic force generating members.

2. The actuator of claim 1, wherein the lens mounting unit comprises:
   a fixing part having a through hole formed therein;
   a movable part positioned in the through hole of the fixing part and making a light proceeding path so that the lens is mounted therein; and
   a plurality of elastic supports for allowing the movable part to be elastically suspended at the fixing part.

3. The actuator of claim 2, wherein the constant magnetic field generating member is a magnetic material positioned near the lens and installed at one side of the movable part.

4. The actuator of claim 3, wherein the magnetic material has a ring shape or a ring shape divided into several portions.

5. The actuator of claim 2, wherein the variable magnetic field generating member is a laminated coil installed to encompass the fixing part.

6. The actuator of claim 5, wherein the laminated coil comprises:
   an insulation resin having a through hole for assembly with the fixing part; and
   a metallic conductor in a coil form having a small diameter and buried in the insulation resin to encompass the fixing part.

7. The actuator of claim 6, wherein the laminated coil is formed as a multi-layer printed circuit board.

8. The actuator of claim 6, wherein the lens mounting unit is positioned at a predetermined interval from the plurality of elastic supports and the movable part, and includes a transparent substrate coupled to one side of the fixing part.

9. The actuator of claim 8, wherein a reflectionless coating film is formed at a surface of the transparent substrate.

10. The actuator of claim 8, wherein one side of the transparent substrate is formed protruded compared to an outer circumference of the insulation resin, and an electrode pad is formed at the protruded surface of the transparent substrate protruded so as to be connected to the coil-shaped metallic conductor and electrically connected to a current controller.

11. The actuator of claim 8, wherein an electrode pad is formed connected to an end of the coil-shaped metallic conductor so as to be electrically connected to a current controller and formed at an upper end of the insulation resin.

12. The actuator of claim 6, wherein the laminated coil is formed as a laminated ceramic circuit board.

13. The actuator of claim 12, wherein the laminated ceramic circuit board is a LTCC (Low Temperature Co-fired Ceramic) board.

14. The actuator of claim 2, wherein the lens mounting unit is positioned at a predetermined interval from the plurality of elastic supports and the movable part, and includes a transparent substrate coupled to one side of the fixing part, and the constant magnetic field generating member is a permanent magnet.

15. The actuator of claim 14, wherein the permanent magnet is disposed to encompass the light proceeding path.

16. The actuator of claim 15, wherein the permanent magnet has a ring shape with its inner side hollowed.

17. The actuator of claim 15, wherein a groove is formed at the fixing part to dispose the permanent magnet therein.

18. The actuator of claim 15, wherein the permanent magnet is disposed at a lower side of the transparent substrate.

19. The actuator of claim 14, wherein the permanent magnet is disposed at an outer side to encompass the fixing part and the transparent substrate.

20. The actuator of claim 15, wherein the permanent magnet is disposed at an upper surface of the fixing part.

21. The actuator of claim 20, wherein an insulation film is coated at one end of the permanent magnet to prevent an electric short.

22. The actuator of claim 2, wherein the variable magnetic field generating member is a flat plate coil positioned near the lens and integrated at one side of the movable part.

23. The actuator of claim 22, wherein a plurality of lines are formed on the plurality of elastic supports and at one surface of the fixing part, and a plurality of electrode pads are formed and electrically connected to the plurality of lines.

24. The actuator of claim 22, wherein the flat plate coil is formed as a single layer or a multi-layer by a micro-machining technique.

25. The actuator of claim 22, wherein the flat plate coil is fabricated as a self-bonding wire and bonded to the movable part.

* * * * *